United States Patent
Knoll et al.

(10) Patent No.: US 11,530,035 B2
(45) Date of Patent: Dec. 20, 2022

(54) VTOL AIRCRAFT HAVING MULTIPLE WING PLANFORMS

(71) Applicant: Textron Innovations Inc., Providence, RI (US)

(72) Inventors: Jonathan Andrew Knoll, Burleson, TX (US); George Matthew Thompson, Lewisville, TX (US); Matthew Edward Louis, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 278 days.

(21) Appl. No.: 17/005,194

(22) Filed: Aug. 27, 2020

(65) Prior Publication Data

US 2022/0063799 A1     Mar. 3, 2022

(51) Int. Cl.
*B64C 29/02*     (2006.01)
*B64C 39/08*     (2006.01)
*B64C 39/02*     (2006.01)

(52) U.S. Cl.
CPC ............ *B64C 29/02* (2013.01); *B64C 39/024* (2013.01); *B64C 39/08* (2013.01);
(Continued)

(58) Field of Classification Search
CPC ....... B64C 29/02; B64C 39/024; B64C 39/08; B64C 2201/027; B64C 2201/088; B64C 2201/108; B64C 2201/141
See application file for complete search history.

(56) References Cited

U.S. PATENT DOCUMENTS 1,655,113 A    1/1928   Nikola
2,601,090 A    6/1952   James
(Continued)

FOREIGN PATENT DOCUMENTS

CN      105539833 A     5/2016
CN      108177766 A   *   6/2018   ............. B64C 27/08
(Continued)

OTHER PUBLICATIONS

Air Launched Unmanned Disaster Relief Delivery Vehicle, 33rd Annual AHS Student Design Competition, University of Maryland, Undated but admitted prior art.
(Continued)

*Primary Examiner* — Benjamin P Lee
(74) *Attorney, Agent, or Firm* — Lawrence Youst PLLC

(57) ABSTRACT

An aircraft having multiple wing planforms. The aircraft includes an airframe having first and second half-wings with first and second pylons extending therebetween. A distributed thrust array is attached to the airframe. The thrust array includes a plurality of propulsion assemblies coupled to the first half-wing and a plurality of propulsion assemblies coupled to the second half-wing. A flight control system is coupled to the airframe. The fight control system is configured to independently control each of the propulsion assemblies and control conversions between the wing planforms. The aircraft is configured to convert between thrust-borne lift in a VTOL orientation and wing-borne lift in a forward flight orientation. In addition, the aircraft is configured to convert between a biplane configuration and a monoplane configuration in the forward flight orientation.

20 Claims, 12 Drawing Sheets

(52) U.S. Cl.
CPC .. *B64C 2201/027* (2013.01); *B64C 2201/102* (2013.01); *B64C 2201/108* (2013.01); *B64C 2201/141* (2013.01); *B64C 2201/146* (2013.01)

(56) References Cited

U.S. PATENT DOCUMENTS

| | | |
|---|---|---|
| 2,655,997 A | 10/1953 | Peterson |
| 2,688,843 A | 9/1954 | Pitt |
| 3,002,712 A | 10/1961 | Sterling |
| 3,081,964 A | 3/1963 | Quenzler |
| 3,181,810 A | 5/1965 | Olson |
| 3,259,343 A | 7/1966 | Roppel |
| 3,289,980 A | 12/1966 | Gardner |
| 3,350,035 A | 10/1967 | Schlieben |
| 3,592,412 A | 7/1971 | Glatfelter |
| 3,618,875 A | 11/1971 | Kappus |
| 3,783,618 A | 1/1974 | Kawamura |
| 3,916,588 A | 11/1975 | Magill |
| 4,243,358 A | 1/1981 | Carlock et al. |
| 4,458,864 A | 7/1984 | Colombo et al. |
| 4,571,157 A | 2/1986 | Eickmann |
| 4,596,368 A | 6/1986 | Schmittle |
| 4,613,098 A | 9/1986 | Eickmann |
| 4,741,672 A | 5/1988 | Breuner |
| 4,771,967 A | 9/1988 | Geldbaugh |
| 4,913,377 A | 4/1990 | Eickmann |
| 4,925,131 A | 5/1990 | Eickmann |
| 5,131,605 A | 7/1992 | Kress |
| 5,188,512 A | 2/1993 | Thornton |
| 5,592,894 A | 1/1997 | Johnson |
| 5,842,667 A | 12/1998 | Jones |
| 6,086,015 A | 7/2000 | MacCready |
| 6,170,778 B1 | 1/2001 | Cycon et al. |
| 6,260,793 B1 | 7/2001 | Balayn et al. |
| 6,270,038 B1 | 8/2001 | Cycon et al. |
| 6,402,088 B1 | 6/2002 | Syrovy et al. |
| 6,655,631 B2 | 12/2003 | Austen-Brown |
| 6,845,939 B1 | 1/2005 | Baldwin |
| 6,886,776 B2 | 5/2005 | Wagner et al. |
| 6,892,980 B2 | 5/2005 | Kawai |
| 7,059,562 B2 | 6/2006 | Baldwin |
| 7,150,429 B2 | 12/2006 | Kusic |
| 7,210,654 B1 | 5/2007 | Cox et al. |
| 7,465,236 B2 | 12/2008 | Wagels |
| 7,472,863 B2 | 1/2009 | Pak |
| 7,555,893 B2 | 7/2009 | Okai et al. |
| 7,984,684 B2 | 7/2011 | Hinderks |
| 8,152,096 B2 | 4/2012 | Smith |
| 8,393,564 B2 | 3/2013 | Kroo |
| 8,505,846 B1 | 8/2013 | Sanders |
| 8,602,348 B2 | 12/2013 | Bryant |
| 8,646,720 B2 | 2/2014 | Shaw |
| 8,733,690 B2 | 5/2014 | Bevirt et al. |
| 8,800,912 B2 | 8/2014 | Oliver |
| 8,820,672 B2 | 9/2014 | Erben et al. |
| 8,833,692 B2 | 9/2014 | Yoeli |
| 8,909,391 B1 | 12/2014 | Peeters et al. |
| 8,948,935 B1 | 2/2015 | Peeters et al. |
| 9,022,312 B2 | 5/2015 | Kosheleff |
| 9,045,226 B2 | 6/2015 | Piasecki et al. |
| 9,087,451 B1 | 7/2015 | Jarrell |
| 9,108,744 B2 | 8/2015 | Takeuchi |
| 9,109,575 B2 | 8/2015 | Weddendorf et al. |
| 9,120,560 B1 | 9/2015 | Armer et al. |
| 9,127,908 B2 | 9/2015 | Miralles |
| 9,162,753 B1 | 10/2015 | Panto et al. |
| 9,187,174 B2 | 11/2015 | Shaw |
| 9,193,460 B2 | 11/2015 | Laudrain |
| 9,221,538 B2 | 12/2015 | Takahashi et al. |
| 9,242,714 B2 | 1/2016 | Wang et al. |
| 9,254,916 B2 | 2/2016 | Yang |
| 9,284,049 B1 | 3/2016 | Wang et al. |
| 9,321,530 B2 | 4/2016 | Wang et al. |
| 9,376,208 B1 | 6/2016 | Gentry |
| 9,388,794 B2 | 7/2016 | Weddendorf et al. |
| 9,403,593 B2 | 8/2016 | Downey et al. |
| 9,440,736 B2 | 9/2016 | Bitar |
| 9,463,875 B2 | 10/2016 | Abuelsaad et al. |
| 9,493,225 B2 | 11/2016 | Wang et al. |
| 9,610,817 B1 | 4/2017 | Piasecki et al. |
| 9,643,720 B2 | 5/2017 | Hesselbarth |
| 9,694,908 B2 | 7/2017 | Razroev |
| 9,694,911 B2 | 7/2017 | Bevirt et al. |
| 9,714,087 B2 | 7/2017 | Matsuda |
| 9,798,322 B2 | 10/2017 | Bachrach et al. |
| 9,800,091 B2 | 10/2017 | Nugent, Jr. et al. |
| 9,821,909 B2 | 11/2017 | Moshe |
| 9,963,228 B2 | 5/2018 | McCullough et al. |
| 9,994,313 B2 | 6/2018 | Claridge et al. |
| 10,011,351 B2 | 7/2018 | McCullough et al. |
| 10,124,890 B2 | 11/2018 | Sada-Salinas et al. |
| 10,183,746 B2 | 1/2019 | McCullough et al. |
| 10,214,285 B2 | 2/2019 | McCullough et al. |
| 10,220,944 B2 | 3/2019 | McCullough et al. |
| 10,227,133 B2 | 3/2019 | McCullough et al. |
| 10,232,950 B2 | 3/2019 | McCullough et al. |
| 10,301,016 B1 | 5/2019 | Bondarev et al. |
| 10,322,799 B2 | 6/2019 | McCullough et al. |
| 10,814,973 B2 * | 10/2020 | Gaffney ............... B64C 29/02 |
| 10,894,602 B2 * | 1/2021 | Hefner ................. B64C 39/024 |
| 11,180,239 B2 * | 11/2021 | Chen .................... B64C 39/08 |
| 11,180,252 B2 * | 11/2021 | Varigas ................ B64C 3/38 |
| 2002/0100834 A1 | 8/2002 | Baldwin |
| 2002/0100835 A1 | 8/2002 | Kusic |
| 2003/0062443 A1 | 4/2003 | Wagner et al. |
| 2004/0245374 A1 | 12/2004 | Morgan |
| 2006/0091258 A1 | 5/2006 | Chiu et al. |
| 2006/0266881 A1 | 11/2006 | Hughey |
| 2007/0212224 A1 | 9/2007 | Podgurski |
| 2007/0221780 A1 | 9/2007 | Builta |
| 2009/0008499 A1 | 1/2009 | Shaw |
| 2010/0147993 A1 | 6/2010 | Annati et al. |
| 2010/0193644 A1 | 8/2010 | Karem |
| 2010/0282917 A1* | 11/2010 | O'Shea ................ B64C 39/024 244/49 |
| 2010/0295321 A1 | 11/2010 | Bevirt |
| 2011/0001001 A1 | 1/2011 | Bryant |
| 2011/0042508 A1 | 2/2011 | Bevirt |
| 2011/0042509 A1 | 2/2011 | Bevirt et al. |
| 2011/0057453 A1 | 3/2011 | Roberts |
| 2011/0121570 A1 | 5/2011 | Bevirt et al. |
| 2011/0315806 A1 | 12/2011 | Piasecki et al. |
| 2012/0209456 A1 | 8/2012 | Harmon et al. |
| 2012/0234968 A1 | 9/2012 | Smith |
| 2013/0020429 A1 | 1/2013 | Kroo |
| 2013/0175404 A1 | 7/2013 | Shefer |
| 2013/0341458 A1 | 12/2013 | Sutton et al. |
| 2014/0018979 A1 | 1/2014 | Goossen et al. |
| 2014/0097290 A1 | 4/2014 | Leng |
| 2014/0339372 A1 | 11/2014 | Dekel et al. |
| 2015/0012154 A1 | 1/2015 | Senkel et al. |
| 2015/0014475 A1 | 1/2015 | Taylor et al. |
| 2015/0136897 A1 | 5/2015 | Seibel et al. |
| 2015/0284079 A1 | 10/2015 | Matsuda |
| 2015/0285165 A1 | 10/2015 | Steinwandel et al. |
| 2016/0068265 A1 | 3/2016 | Hoareau et al. |
| 2016/0180717 A1 | 6/2016 | Ubhi et al. |
| 2016/0214712 A1 | 7/2016 | Fisher et al. |
| 2017/0008627 A1 | 1/2017 | Soto et al. |
| 2017/0021924 A1 | 1/2017 | Kubik et al. |
| 2017/0066531 A1 | 3/2017 | McAdoo |
| 2017/0097644 A1 | 4/2017 | Fegely et al. |
| 2017/0144746 A1 | 5/2017 | Schank et al. |
| 2017/0158312 A1 | 6/2017 | Alber et al. |
| 2017/0174342 A1 | 6/2017 | Huang |
| 2017/0240274 A1 | 8/2017 | Regev |
| 2017/0283052 A1* | 10/2017 | Moshe ................... B64C 29/02 |
| 2017/0297699 A1 | 10/2017 | Alber et al. |
| 2017/0327219 A1 | 11/2017 | Alber |
| 2017/0334557 A1 | 11/2017 | Alber et al. |
| 2018/0002011 A1 | 1/2018 | McCullough et al. |
| 2018/0002012 A1 | 1/2018 | McCullough et al. |
| 2018/0002013 A1 | 1/2018 | McCullough et al. |
| 2018/0002014 A1 | 1/2018 | McCullough et al. |

(56) References Cited

U.S. PATENT DOCUMENTS

| | | |
|---|---|---|
| 2018/0002015 A1 | 1/2018 | McCullough et al. |
| 2018/0002016 A1 | 1/2018 | McCullough et al. |
| 2018/0002026 A1 | 1/2018 | Oldroyd et al. |
| 2018/0002027 A1 | 1/2018 | McCullough et al. |
| 2018/0022467 A1 | 1/2018 | Alber |
| 2018/0044011 A1 | 2/2018 | Reichert |
| 2018/0244377 A1 | 8/2018 | Chan |
| 2018/0244383 A1 | 8/2018 | Valente et al. |
| 2018/0257761 A1 | 9/2018 | Oldroyd et al. |
| 2018/0265193 A1 | 9/2018 | Gibboney et al. |
| 2018/0273160 A1 | 9/2018 | Baldwin et al. |
| 2018/0327092 A1 | 11/2018 | Deng et al. |
| 2018/0362158 A1 | 12/2018 | Zhang et al. |
| 2019/0031331 A1 | 1/2019 | McCullough et al. |
| 2019/0031334 A1 | 1/2019 | McCullough et al. |
| 2019/0031335 A1 | 1/2019 | McCullough et al. |
| 2019/0031336 A1 | 1/2019 | McCullough et al. |
| 2019/0031337 A1 | 1/2019 | McCullough et al. |
| 2019/0031338 A1 | 1/2019 | McCullough et al. |
| 2019/0031339 A1 | 1/2019 | McCullough et al. |
| 2019/0031361 A1 | 1/2019 | McCullough et al. |
| 2019/0144108 A1 | 5/2019 | McCullough et al. |
| 2019/0248480 A1* | 8/2019 | Whitten, Jr. .......... B64C 39/024 |
| 2019/0263516 A1 | 8/2019 | McCullough et al. |
| 2019/0389573 A1 | 12/2019 | Kahou et al. |
| 2020/0269967 A1* | 8/2020 | Chen ...................... B64C 3/546 |

FOREIGN PATENT DOCUMENTS

| | | |
|---|---|---|
| FR | 2977865 A3 | 1/2013 |
| GB | 587388 A | 4/1947 |
| GB | 618475 A | 2/1949 |
| GB | 654089 A | 6/1951 |
| WO | 2001074659 A1 | 10/2001 |
| WO | 2005039973 A2 | 5/2005 |
| WO | 2014067563 A1 | 5/2014 |

OTHER PUBLICATIONS

Bell and NASA Partner for UAV Development; Transportup.com; Sep. 9, 2018.
Bell APT—Automatic Pod Transport; SUASNEWS.com; Dec. 6, 2017.
Bell Autonomous Pod Transport; MONCH.com; May 2, 2018.
Wolfe, Frank; Bell Moving to Scale Up Antonymous Delivery Drones for US Military; Rotor & Wing International; Sep. 27, 2018.

* cited by examiner

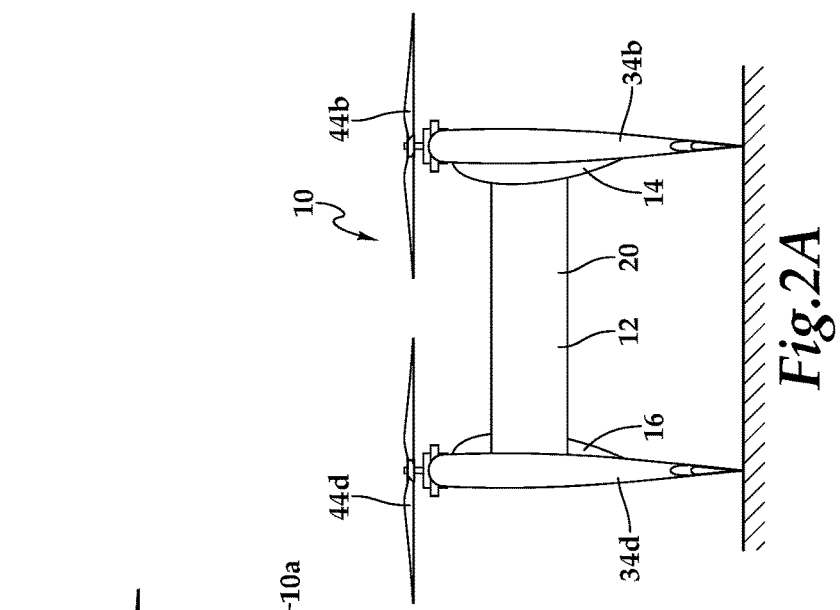
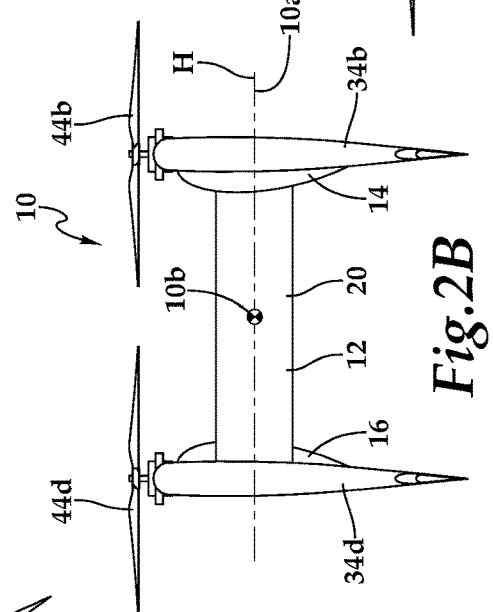
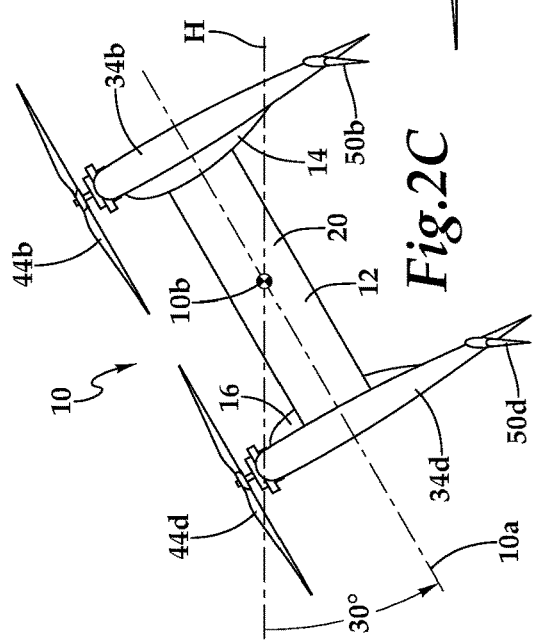

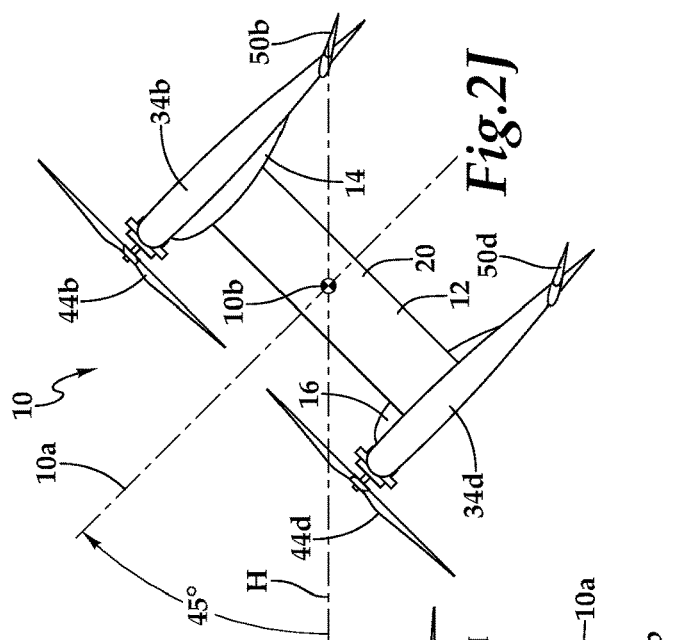
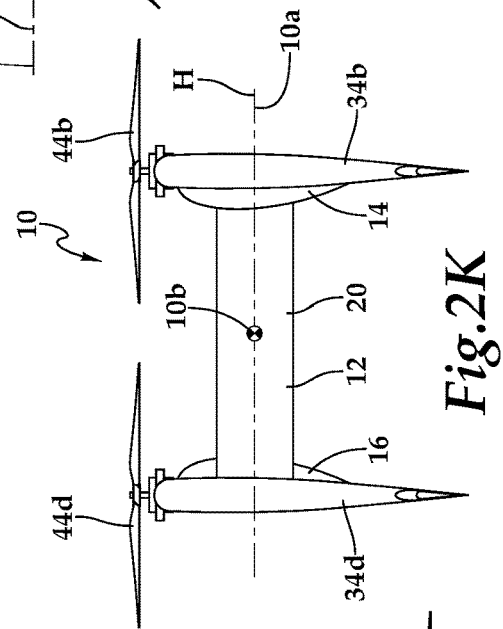
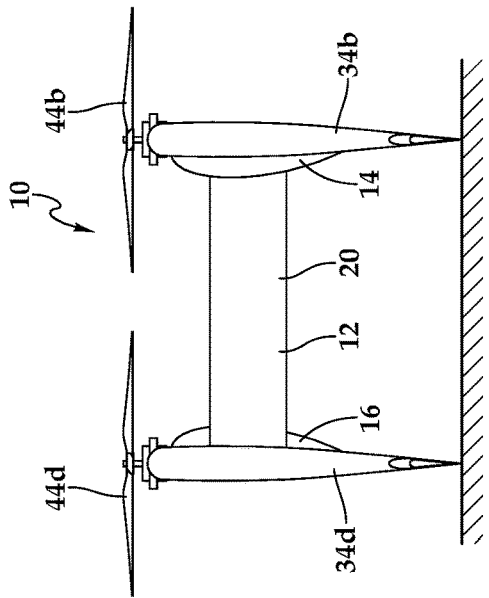

VTOL AIRCRAFT HAVING MULTIPLE WING PLANFORMS

TECHNICAL FIELD OF THE DISCLOSURE

The present disclosure relates, in general, to aircraft configured to convert between thrust-borne lift in a VTOL orientation and wing-borne lift in a forward flight orientation and, in particular, to aircraft having a quadcopter configuration in the VTOL orientation and both a monoplane configuration and a biplane configuration in the forward flight orientation.

BACKGROUND

Unmanned aircraft systems (UAS), also known as unmanned aerial vehicles (UAV) or drones, are self-powered aircraft that do not carry a human operator, uses aerodynamic forces to provide vehicle lift, are autonomously and/or remotely operated, may be expendable or recoverable and may carry lethal or nonlethal payloads. UAS are commonly used in military, commercial, scientific, recreational and other applications. For example, military applications include intelligence, surveillance, reconnaissance and attack missions. Civil applications include aerial photography, search and rescue missions, inspection of utility lines and pipelines, humanitarian aid including delivering food, medicine and other supplies to inaccessible regions, environment monitoring, border patrol missions, cargo transportation, forest fire detection and monitoring, accident investigation and crowd monitoring, to name a few.

Fixed-wing aircraft, such as airplanes, are capable of flight using wings that generate lift responsive to the forward airspeed of the aircraft, which is generated by forward thrust from one or more jet engines or propellers. The wings generally have an airfoil cross section that generates the lift force to support the airplane in flight. Fixed-wing aircraft, however, typically require a runway for takeoff and landing. Unlike fixed-wing aircraft, vertical takeoff and landing (VTOL) aircraft do not require runways. Instead, VTOL aircraft are capable of taking off, hovering and landing vertically. One example of VTOL aircraft is a helicopter which is a rotorcraft having one or more rotors that provide vertical thrust to enable VTOL operations as well as lateral thrust to enable forward, backward and sideward flight. These attributes make helicopters highly versatile for use in congested, isolated or remote areas where fixed-wing aircraft may be unable to takeoff or land. A tiltrotor aircraft is another example of a VTOL aircraft. Tiltrotor aircraft generate vertical and forward thrust using proprotors that are typically coupled to nacelles mounted near the ends of a fixed wing. The nacelles rotate relative to the fixed wing such that the proprotors have a generally horizontal plane of rotation for VTOL operations and a generally vertical plane of rotation for forward flight during which the fixed wing provides lift.

SUMMARY

In a first aspect, the present disclosure is directed to an aircraft having multiple wing planforms. The aircraft includes an airframe having first and second half-wings with first and second pylons extending therebetween. A distributed thrust array is attached to the airframe. The thrust array includes a first plurality of propulsion assemblies coupled to the first half-wing and a second plurality of propulsion assemblies coupled to the second half-wing. A flight control system coupled to the airframe is configured to independently control each of the propulsion assemblies and control conversions between the wing planforms. The aircraft is configured to convert between thrust-borne lift in a VTOL orientation and wing-borne lift in a forward flight orientation. The aircraft is also configured to convert between a biplane configuration and a monoplane configuration in the forward flight orientation.

In some embodiments, the first and second pylons may be pivotably coupled between the first half-wing and the second half-wing. In certain embodiments, in the forward flight orientation, the first half-wing may be an upper half-wing and the second half-wings may be a lower half-wing. In such embodiments, the upper half-wing may have a low wing configuration with the propulsion assemblies attached thereto and the lower half-wing may have a high wing configuration with the propulsion assemblies attached thereto. In other embodiments, each of the half-wings may have two wingtips and each of the propulsion assemblies may be a wingtip mounted propulsion assembly.

In certain embodiments, the aircraft may have a multicopter configuration, such as a quadcopter configuration, in the VTOL orientation. In some embodiments, in the biplane configuration, the thrust array may form a two-dimensional thrust array and in the monoplane configuration, the thrust array may form a one-dimensional thrust array. In certain embodiments, the each of the propulsion assemblies may be a non-thrust vectoring propulsion assembly, a unidirectional thrust vectoring propulsion assembly or an omnidirectional thrust vectoring propulsion assembly. In some embodiments, the flight control system may be configured to convert the aircraft between the biplane configuration and the monoplane configuration during forward flight. In certain embodiments, the flight control system may be configured for remote flight control, for autonomous flight control or combinations thereof. In some embodiments, a pod assembly may be coupled to the airframe. For example, the pod assembly may be coupled between the first and second pylons or the pod assembly may be coupled between the first and second half-wings.

In a second aspect, the present disclosure is directed to an aircraft having multiple wing planforms. The aircraft includes an airframe having first and second half-wings with first and second pylons extending therebetween. A distributed thrust array is attached to the airframe. The thrust array includes two propulsion assemblies coupled to the first half-wing and two propulsion assemblies coupled to the second half-wing. A flight control system is coupled to the airframe and is configured to independently control each of the propulsion assemblies. The aircraft is configured to convert between thrust-borne lift in a VTOL orientation and wing-borne lift in a forward flight orientation. In the VTOL orientation, the distributed thrust array has a quadcopter configuration. In the forward flight orientation, the first and second half-wings have a biplane configuration in a first planform with the thrust array configured as a two-dimensional thrust array and the first and second half-wings have a monoplane configuration in a second planform with the thrust array configured as a one-dimensional thrust array. The flight control system is configured to convert the first and second half-wings between the first and second planforms during forward flight.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2L are schematic illustrations of an aircraft having multiple wing planforms in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1C:
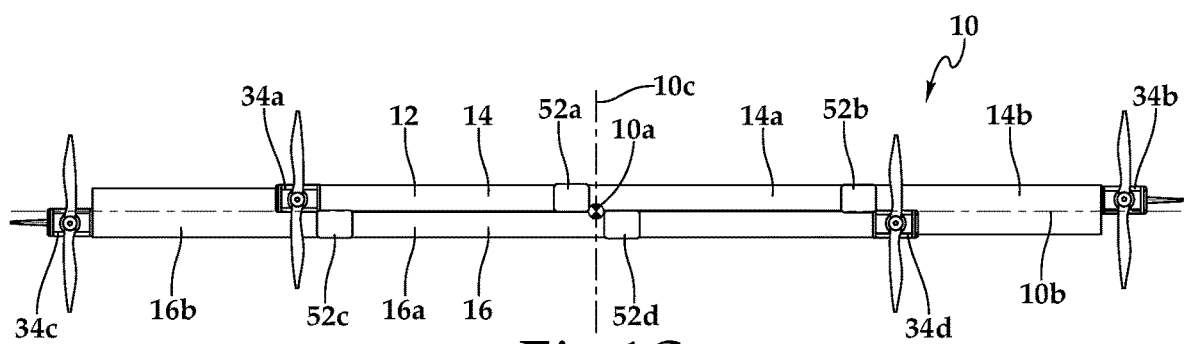
FIGS. 1A-1F are schematic illustrations of an aircraft having multiple wing planforms in accordance with embodiments of the present disclosure.
Figure 1B:
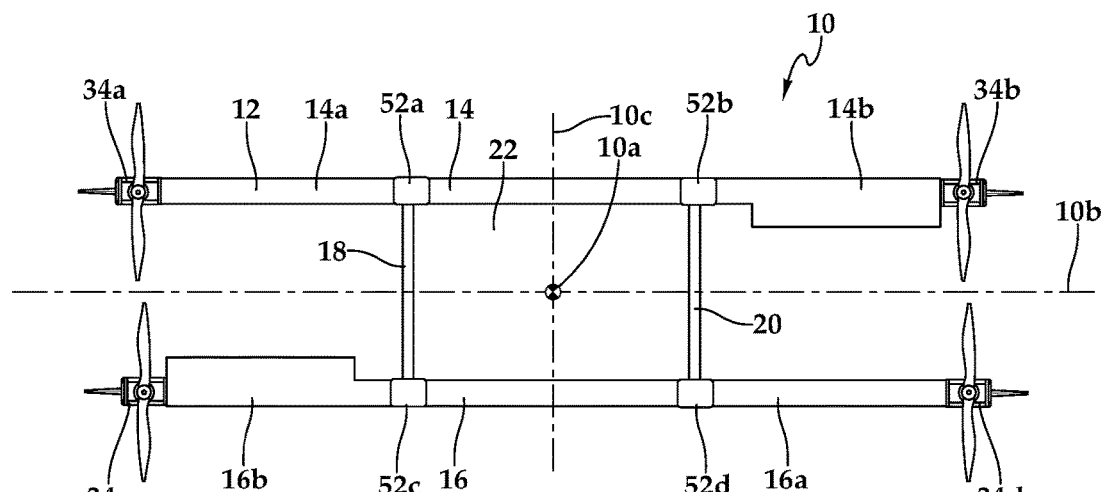
Figure 1A:
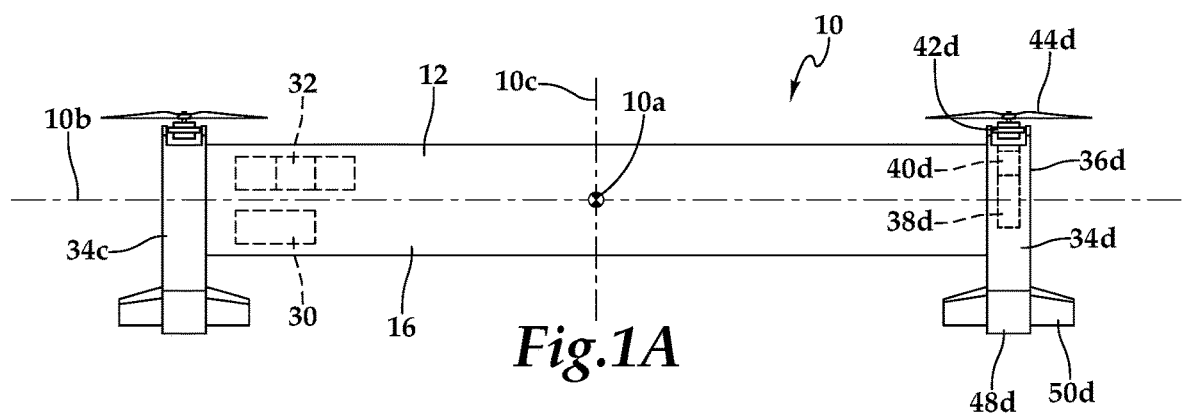
Figure 1F:
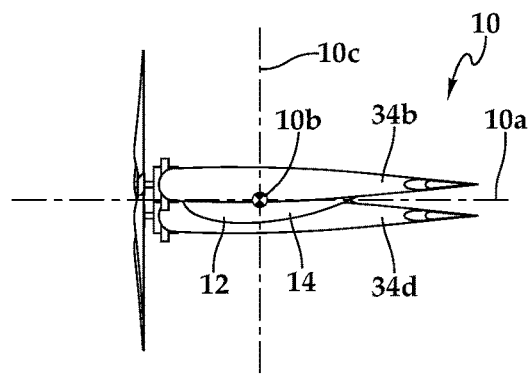
Figure 1E:
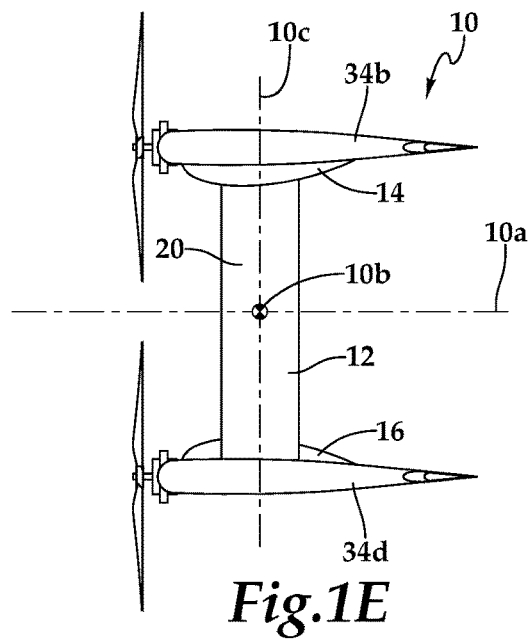
Figure 1D:
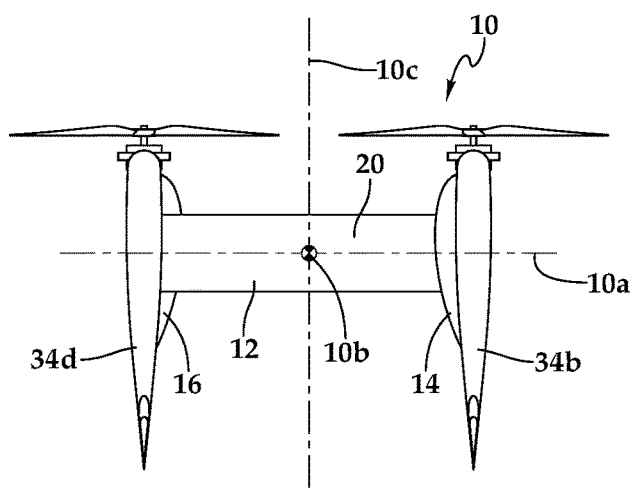

Referring to FIGS. 1A-1F in the drawings, various views of an aircraft 10 having multiple wing planforms that is operable to transition between thrust-borne lift in a VTOL orientation and wing-borne lift in a forward flight orientation are depicted. FIGS. 1A and 1D depict aircraft 10 in the VTOL orientation with a multicopter and more particularly, a quadcopter configuration, wherein the propulsion assemblies provide thrust-borne lift. FIGS. 1B and 1E depict aircraft 10 in the forward flight orientation with a biplane configuration, wherein the propulsion assemblies provide forward thrust with the forward airspeed of aircraft 10 providing wing-borne lift. FIGS. 1C and 1F depict aircraft 10 in the forward flight orientation with a monoplane configuration, wherein the propulsion assemblies provide forward thrust with the forward airspeed of aircraft 10 providing wing-borne lift enabling aircraft 10 to have a long-range or high-endurance flight mode. Aircraft 10 has a longitudinal axis 10a that may also be referred to as the roll axis, a lateral axis 10b that may also be referred to as the pitch axis and a vertical axis 10c that may also be referred to as the yaw axis. When longitudinal axis 10a and lateral axis 10b are both in a horizontal plane and normal to the local vertical in the earth's reference frame, aircraft 10 has a level flight attitude.

In the illustrated embodiment, aircraft 10 has an airframe 12 including half-wings 14, 16. Half-wing 14 includes a wing section 14a that has a partial airfoil cross-section and a wing section 14b that has a full airfoil cross-section. Similarly, half-wing 16 includes a wing section 16a that has a partial airfoil cross-section and a wing section 16b that has a full airfoil cross-section. As discussed herein, when wing section 14a and wing section 16a are mated, together they form a full airfoil cross-section. It should be understood by those having ordinary skill in the art that the use of the term half-wing does not imply that each of wing sections 14a, 16a form half of the full airfoil cross-section or that wing sections 14a, 16a are symmetric wing sections but rather that each of wing sections 14a, 16a form a portion of the full airfoil cross-section. Half-wings 14, 16 may be formed as single members or may be formed from multiple component parts. The outer skins of half-wings 14, 16 are preferably formed from high strength and lightweight materials such as fiberglass, carbon, plastic, metal or other suitable material or combination of materials and may include a lightweight structural core. As best seen in FIGS. 1B and 1C, in the forward flight orientation of aircraft 10, half-wing 14 is an upper wing having a straight wing configuration and half-wing 16 is a lower wing having a straight wing configuration. In other embodiments, half-wings 14, 16 could have other designs such as anhedral and/or dihedral wing designs, swept wing designs or other suitable wing designs. Rotatably coupled between half-wing 14 and half-wing 16 are two truss structures depicted as pylons 18, 20. In other embodiments, more than two pylons may be present. Pylons 18, 20 are preferably formed from high strength and lightweight materials such as fiberglass, carbon, plastic, metal or other suitable material or combination of materials. In the illustrated embodiment, pylons 18, 20 are straight pylons. In other embodiments, pylons 18, 20 may have other shapes.

In the quadcopter configuration of FIGS. 1A and 1D as well as in the biplane configuration of FIGS. 1B and 1E, half-wings 14, 16 and pylons 18, 20 together form a central region 22 having a perimeter in the shape of a rectangle or square depending upon the lengths of pylons 18, 20 and the precise inboard/outboard locations of pylons 18, 20 along half-wings 14, 16. As discussed herein, a payload such as a pod assembly may be coupled to half-wings 14, 16 and/or pylons 18, 20 for transport by aircraft 10. Half-wings 14, 16 and/or pylons 18, 20 may preferably include internal passageways operable to contain flight control systems, energy sources, communication lines and other desired systems. For example, as best seen in FIG. 1A, half-wing 16 houses a flight control system 30 of aircraft 10. Flight control system 30 is preferably a redundant digital flight control system including multiple independent flight control computers. For example, the use of a triply redundant flight control system 30 improves the overall safety and reliability of aircraft 10 in the event of a failure in flight control system 30. Flight control system 30 preferably includes non-transitory computer readable storage media including a set of computer instructions executable by one or more processors for controlling the operation of aircraft 10. Flight control system 30 may be implemented on one or more general-purpose computers, special purpose computers or other machines with memory and processing capability. For example, flight control system 30 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 30 may be a microprocessor-based system operable to execute program code in the form of machine-executable instructions. In addition, flight control system 30 may be selectively connectable to other computer systems via a proprietary encrypted network, a public encrypted network, the Internet or other suitable communication network that may include both wired and wireless connections.

Half-wings 14, 16 and pylons 18, 20 may contain one or more of electrical power sources such as batteries 32 depicted in half-wing 16 in FIG. 1A. Batteries 32 supply electrical power to flight control system 30. In some embodiments, batteries 32 may be used to supply electrical power for the distributed thrust array of aircraft 10. Half-wings 14, 16 and pylons 18, 20 also contain a fly-by-wire communications network that enables flight control system 30 to communicate with the distributed thrust array of aircraft 10. In the quadcopter configuration of FIGS. 1A and 1D as well as in the biplane configuration of FIGS. 1B and 1E, the distributed thrust array of aircraft 10 is a two-dimensional distributed thrust array. In the monoplane configuration of FIGS. 1C and 1F, the distributed thrust array of aircraft 10 is considered to be a one-dimensional distributed thrust array.

As used herein, the term "two-dimensional thrust array" refers to a plurality of thrust generating elements that occupy a two-dimensional space in the form of a plane. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "one-dimensional thrust array" refers to a plurality of thrust generating elements that occupy a one-dimensional space substantially in the form of a line. As used herein, the term "distributed thrust array" refers to the use of multiple thrust generating elements each producing a portion of the total thrust output. The use of a distributed thrust array provides redundancy to the thrust generation capabilities of the aircraft including fault tolerance in the event of the loss of one of the thrust generating elements. A distributed thrust array can be used in conjunction with a "distributed power system" in which power to each of the thrust generating elements is supplied by a local power source instead of a centralized power source. For example, in a distributed thrust array having a plurality of propulsion assemblies acting as the thrust generating elements, a distributed power system may include individual battery elements housed within the nacelle of each propulsion assembly.

The distributed thrust array of aircraft 10 includes a plurality of propulsion assemblies, collectively referred to as propulsion assemblies 34 and individually denoted as propulsion assemblies 34a, 34b, 34c, 34d. In the illustrated embodiment, two propulsion assemblies 34a, 34b are coupled to half-wing 14 and two propulsion assemblies 34c, 34d are coupled to half-wing 16. Even though the illustrated embodiment depicts four propulsion assemblies with two propulsion assemblies coupled to each wing, the distributed thrust array of aircraft 10 could have other numbers of propulsion assemblies in other configurations. In the illustrated embodiment, propulsion assemblies 34 are variable speed propulsion assemblies having fixed pitch rotor blades with omnidirectional thrust vectoring capability controlled by a two-axis gimbal. In other embodiments, propulsion assemblies 34 may have a single-axis gimbal, in which case, the propulsion assemblies could act as longitudinal and/or lateral thrust vectoring propulsion assemblies. In other embodiments, propulsion assemblies 34 could have variable pitch rotor blades with collective and/or cyclic pitch control, could be single speed propulsion assemblies and/or could be non-thrust vectoring propulsion assemblies.

Propulsion assemblies 34 may be independently attachable to and detachable from airframe 12 and may be standardized and/or interchangeable units and preferably line replaceable units providing easy installation and removal from airframe 12. The use of line replaceable propulsion units is beneficial in maintenance situations if a fault is discovered with one of the propulsion assemblies. In this case, the faulty propulsion assembly 34 can be decoupled from airframe 12 by simple operations and another propulsion assembly 34 can then be attached to airframe 12. In other embodiments, propulsion assemblies 34 may be permanently coupled to half-wings 14, 16.

As best seen in FIG. 1A, propulsion assembly 34d includes a nacelle 36d that houses components including a battery 38d and an electronics node 40d that may include controllers, actuators, sensors and other desired electronic equipment. Propulsion assembly 34d also includes a variable speed electric motor 42d and a rotor assembly 44d that are gimbal mounted to nacelle 36d such that electric motor 42d and a rotor assembly 44d are tiltable together relative nacelle 36d. Extending from a lower end of nacelle 36d is a tail assembly 48d having a suitable landing gear (not visible) and that includes a pair of movable aerosurfaces 50d. It is noted that propulsion assembly 34d is substantially similar to the other propulsion assemblies 34 therefore, for the sake of efficiency, certain features have been disclosed only with regard to propulsion assembly 34d. One having ordinary skill in the art, however, will fully appreciate an understanding of each of the propulsion assemblies 34 based upon the disclosure herein of propulsion assembly 34d noting that the components of propulsion assemblies 34 may be collectively referred to herein as batteries 38, electronics nodes 40, electric motors 42, rotor assemblies 44, tail assemblies 48 and aerosurfaces 50.

In the illustrated embodiment, as power for each propulsion assembly 34 is provided by a battery 38 housed within the nacelle 36, aircraft 10 has a distributed power system for the distributed thrust array. Alternatively or additionally, electrical power may be supplied to the electric motors 42 and/or the batteries 38 from batteries 32 carried by airframe 12 via the communications network. In other embodiments, power for the propulsion assemblies of aircraft 10 may be provided by one or more internal combustion engines, electric generators and/or hydraulic motors. In the illustrated embodiment, aerosurfaces 50 are active aerosurfaces that serve as elevators to control the pitch or angle of attack of half-wings 14, 16 and/or ailerons to control the roll or bank of aircraft 10 in the forward flight orientation of aircraft 10. Aerosurfaces 50 may also serve to enhance hover stability in the VTOL orientation of aircraft 10.

Flight control system 30 communicates via the fly-by-wire communications network of airframe 12 with electronics nodes 40 of propulsion assemblies 34. Flight control system 30 receives sensor data from and sends flight command information to the electronics nodes 40 such that each propulsion assembly 34 may be individually and independently controlled and operated. For example, flight control system 30 is operable to individually and independently control the speed and the thrust vector of each propulsion assembly 34. In addition, flight control system 30 communicates via the fly-by-wire communications network of airframe 12 with wing actuators located within hinge assemblies 52a, 52b of half-wing 14 and hinge assemblies 52c, 52d of half-wing 16, as best seen in FIGS. 1B and 1C. The wing actuator of hinge assembly 52a is configured to rotate pylon 18 relative to half-wing 14. The wing actuator of hinge assembly 52b is configured to rotate pylon 20 relative to half-wing 14. The wing actuator of hinge assembly 52c is configured to rotate pylon 18 relative to half-wing 16. The wing actuator of hinge assembly 52d is configured to rotate pylon 20 relative to half-wing 16. Together, the wing actuators enable flight control system 30 to convert aircraft 10 between the biplane configuration (FIGS. 1B and 1E) and the monoplane configuration (FIGS. 1C and 1F) during forward flight. Flight control system 30 may autonomously control some or all aspects of flight operation for aircraft 10. Flight control system 30 is also operable to communicate with remote systems, such as a ground station via a wireless communications protocol. The remote system may be operable to receive flight data from and provide commands to flight control system 30 to enable remote flight control over some or all aspects of flight operation for aircraft 10.

Figure 2D:
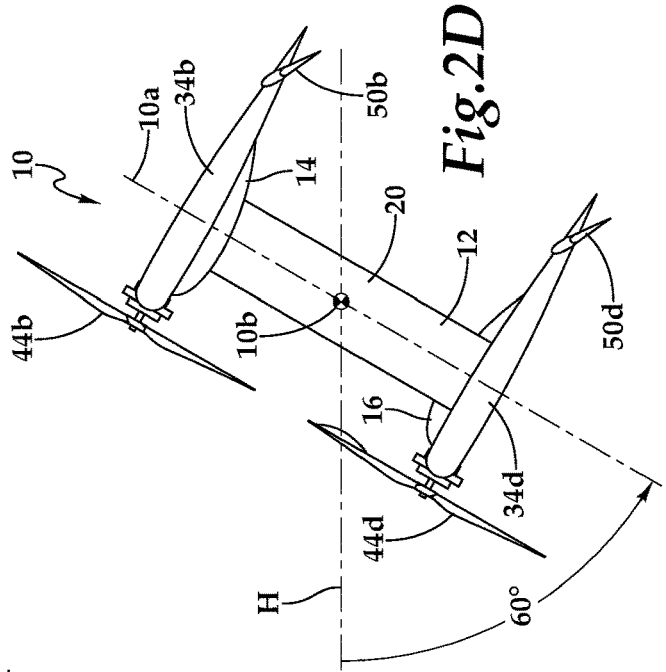

Referring additionally to FIGS. 2A-2L in the drawings, a sequential flight-operating scenario of aircraft 10 is depicted. As best seen in FIG. 2A, aircraft 10 is in a tailsitting position on a surface such as the ground. When aircraft 10 is ready for a mission, flight control system 30 commences operations to provide flight control to aircraft 10 which may be autonomous flight control, remote flight control or a combination thereof. For example, it may be desirable to utilize remote flight control during certain maneuvers such as takeoff and landing but rely on autonomous flight control during hover, high speed forward flight, transitions between wing-borne flight and thrust-borne flight and/or transitions between the wing planforms of aircraft 10.

As best seen in FIG. 2B, aircraft 10 has performed a vertical takeoff and is engaged in thrust-borne lift. As illustrated, the rotor assemblies 44 are each rotating in the same horizontal plane forming a two-dimensional distributed thrust array. As longitudinal axis 10a and lateral axis 10b (denoted as the target) are both in a horizontal plane H normal to the local vertical in the earth's reference frame, aircraft 10 has a level flight attitude. As discussed herein, flight control system 30 independently controls and operates each propulsion assembly 34 including independently controlling speed, thrust vector and aerosurface position. During hover, flight control system 30 may utilize speed control, thrust vectoring and/or aerosurface maneuvers of selected propulsion assemblies 34 for providing hover stability for aircraft 10 and for providing pitch, roll, yaw and translation authority for aircraft 10. As used herein, the term "hover stability" refers to remaining in one place in the air while maintaining a generally or substantially static flight attitude.

After vertical assent to the desired elevation, aircraft 10 may begin the transition from thrust-borne lift to wing-borne lift. As best seen from the progression of FIGS. 2B-2E, aircraft 10 is operable to pitch down from the VTOL orientation toward the forward flight orientation. As seen in FIG. 2C, longitudinal axis 10a extends out of the horizontal plane H such that aircraft 10 has an inclined flight attitude of about thirty degrees pitch down. As seen in FIG. 2D, longitudinal axis 10a extends out of the horizontal plane H such that aircraft 10 has an inclined flight attitude of about sixty degrees pitch down. Flight control system 30 may achieve this operation through speed control of some or all of propulsion assemblies 34, collective thrust vectoring of propulsion assemblies 34, collective maneuvers of aerosurfaces 50 or any combination thereof.

Figure 2E:
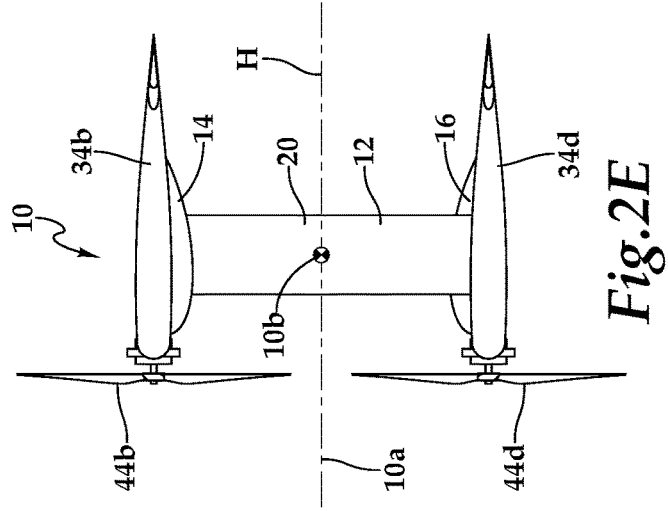
Figure 2F:
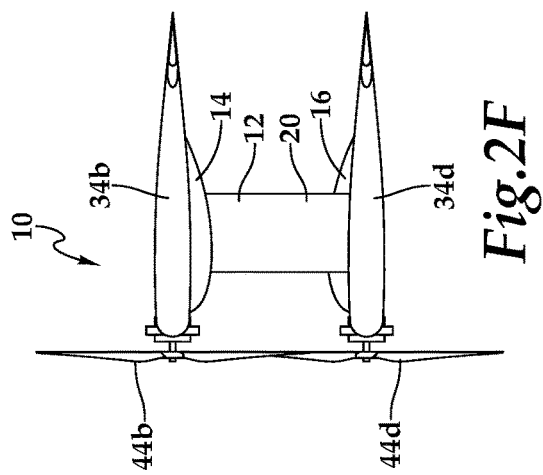

As best seen in FIG. 2E, rotor assemblies 44 of propulsion assemblies 34 are each rotating in the same vertical plane forming a two-dimensional distributed thrust array. By convention, longitudinal axis 10a has been reset to be in the horizontal plane H, which also includes lateral axis 10b, such that aircraft 10 has a level flight attitude in the biplane configuration. In the biplane configuration, the independent control provided by flight control system 30 over each propulsion assembly 34 provides pitch, roll and yaw authority using collective or differential thrust vectoring, differential speed control, collective or differential aerosurface maneuvers or any combination thereof. For long range flights requiring high endurance, aircraft 10 can be converted to a low drag configuration as best seen in the progression of FIGS. 2E-2G and FIGS. 3A-3C. In the illustrated embodiment, this is achieved by engaging the wing actuators to pivot or rotate pylons 18, 20 relative to half-wings 14, 16. As best seen in FIGS. 2F and 3B, pylon 18 has rotated about forty-five degrees relative to half-wing 14 at hinge assembly 52a and about forty-five degrees relative to half-wing 16 at hinge assembly 52c. Likewise, pylon 20 has rotated about forty-five degrees relative to half-wing 14 at hinge assembly 52b and about forty-five degrees relative to half-wing 16 at hinge assembly 52d. This rotation has reduced the distance between half-wings 14, 16 and has shifted half-wing 14 to the right relative to half-wing 16, as best seen in FIG. 3B.

Figure 2G:
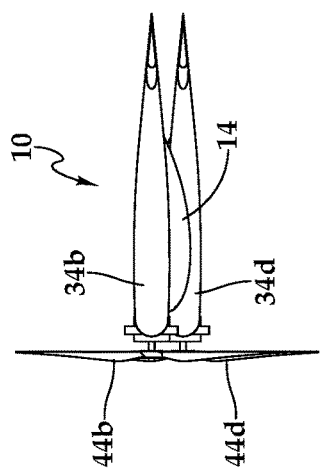
Figure 3C:
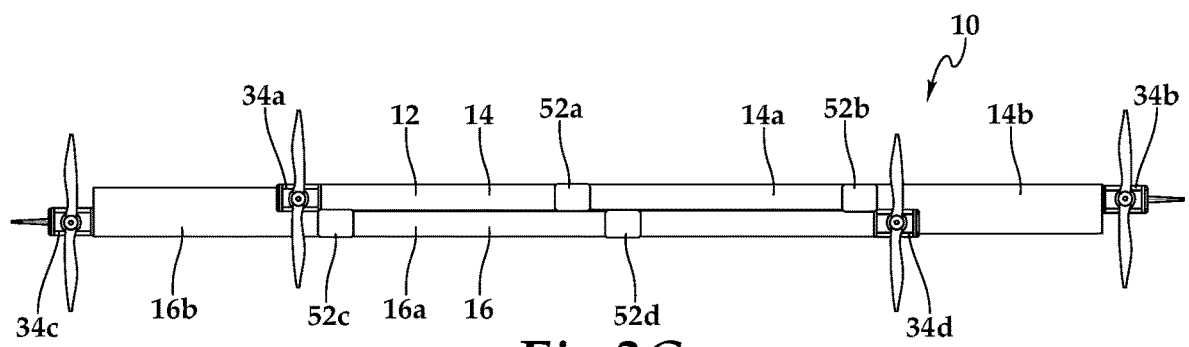
FIGS. 3A-3C are schematic illustrations of an aircraft having multiple wing planforms that is converting between a biplane configuration and a monoplane configuration in accordance with embodiments of the present disclosure.
Figure 3B:
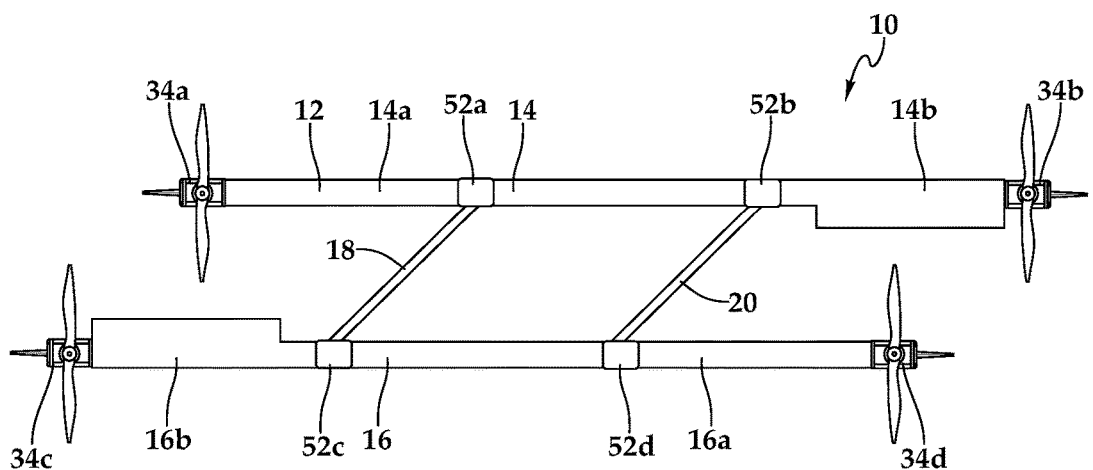

As best seen in FIGS. 2G and 3C, pylon 18 has rotated about ninety degrees relative to half-wing 14 at hinge assembly 52a and about ninety degrees relative to half-wing 16 at hinge assembly 52c. Likewise, pylon 20 has rotated about ninety degrees relative to half-wing 14 at hinge assembly 52b and about ninety degrees relative to half-wing 16 at hinge assembly 52d. This rotation shifts half-wing 14 further to the right relative to half-wing 16 and brings half-wing 14 into contact with half-wing 16 such that wing section 14a and wing section 16a mate to form a full airfoil cross-section that is complementary of or congruent with wing sections 14b, 16b. In the illustrated embodiment, portions of pylons 18, 20 are received within respective slots (not visible) in half-wings 14, 16 to enable mating of wing sections 14a, 16a to form the airfoil cross-section. The conversion of aircraft 10 from the biplane configuration to the monoplane configuration is now complete providing for high efficiency flight with reduced drag compared to the biplane configuration. As best seen in FIGS. 2G and 3C, rotor assemblies 44 of propulsion assemblies 34 are aerodynamically in line with one another thus forming a one-dimensional distributed thrust array. In the monoplane configuration, collective maneuvers of aerosurfaces 50 provide pitch authority, differential maneuvers of aerosurfaces 50 provide roll authority and differential speed control of propulsion assemblies 34 provides yaw authority.

Figure 2H:
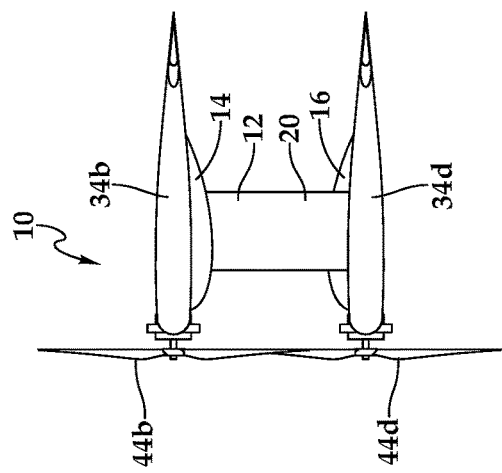
Figure 2I:
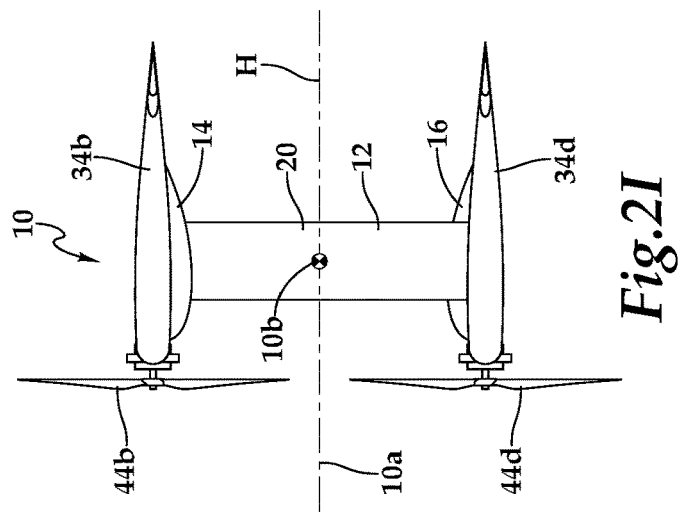
Figure 3A:
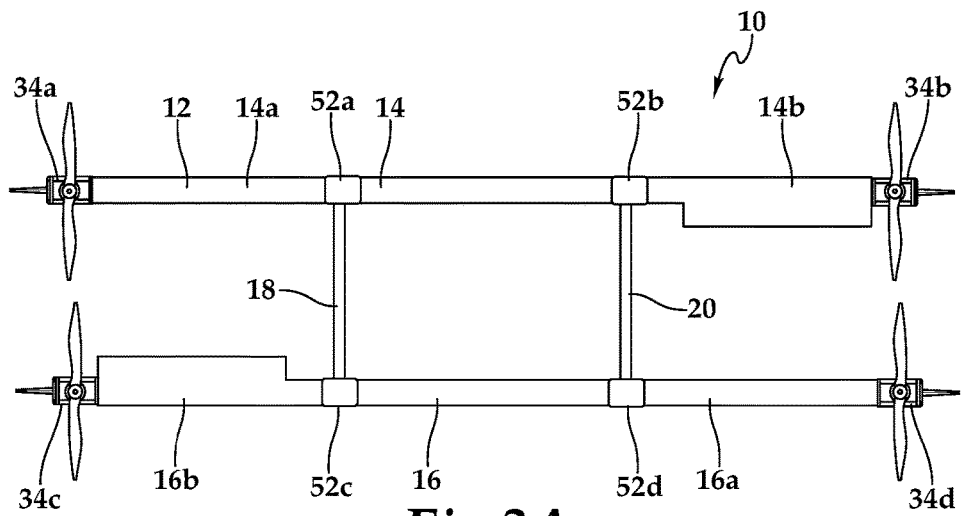

As aircraft 10 approaches its destination, aircraft 10 may begin its transition from the monoplane configuration to the biplane configuration as best seen in the progression of FIGS. 2G-2I and FIGS. 3C-3A. As best seen in FIGS. 2H and 3B, pylon 18 has rotated about forty-five degrees relative to half-wing 14 at hinge assembly 52a and about forty-five degrees relative to half-wing 16 at hinge assembly 52c. Likewise, pylon 20 has rotated about forty-five degrees relative to half-wing 14 at hinge assembly 52b and about forty-five degrees relative to half-wing 16 at hinge assembly 52d. This rotation has separated half-wings 14, 16 and has shifted half-wing 14 to the left relative to half-wing 16. As best seen in FIGS. 2I and 3A, pylon 18 has rotated about ninety degrees relative to half-wing 14 at hinge assembly 52a and about ninety degrees relative to half-wing 16 at hinge assembly 52c. Likewise, pylon 20 has rotated about ninety degrees relative to half-wing 14 at hinge assembly 52b and about ninety degrees relative to half-wing 16 at hinge assembly 52d. This rotation shifts half-wing 14 further to the left relative to half-wing 16 until half-wings 14, 16 are vertically aligned and pylon 18, 20 are generally perpendicular to half-wings 14, 16. The conversion of aircraft 10 from the monoplane configuration to the biplane configuration is now complete.

Aircraft 10 may now begin its transition from wing-borne lift to thrust-borne lift. As best seen from the progression of FIGS. 2I-2K, aircraft 10 is operable to pitch up from the forward flight orientation to the VTOL orientation to enable hover operations. As seen in FIG. 2J, longitudinal axis 10a extends out of the horizontal plane H such that aircraft 10 has an inclined flight attitude of about forty-five degrees pitch up. Flight control system 30 may achieve this operation through speed control of some or all of propulsion assemblies 34, collective thrust vectoring of propulsion assemblies 34, collective maneuvers of aerosurfaces 50 or any combination thereof. In FIG. 2K, aircraft 10 has completed the transition from the forward flight orientation to the VTOL orientation and, by convention, longitudinal axis 10a has been reset to be in the horizontal plane H which also includes lateral axis 10b such that aircraft 10 has a level flight attitude in the VTOL orientation. Once aircraft 10 has completed the transition to the VTOL orientation, aircraft 10 may commence its vertical descent to a surface. As best seen in FIG. 2L, aircraft 10 has landed in a tailsitting orientation at the destination location.

Figure 4:
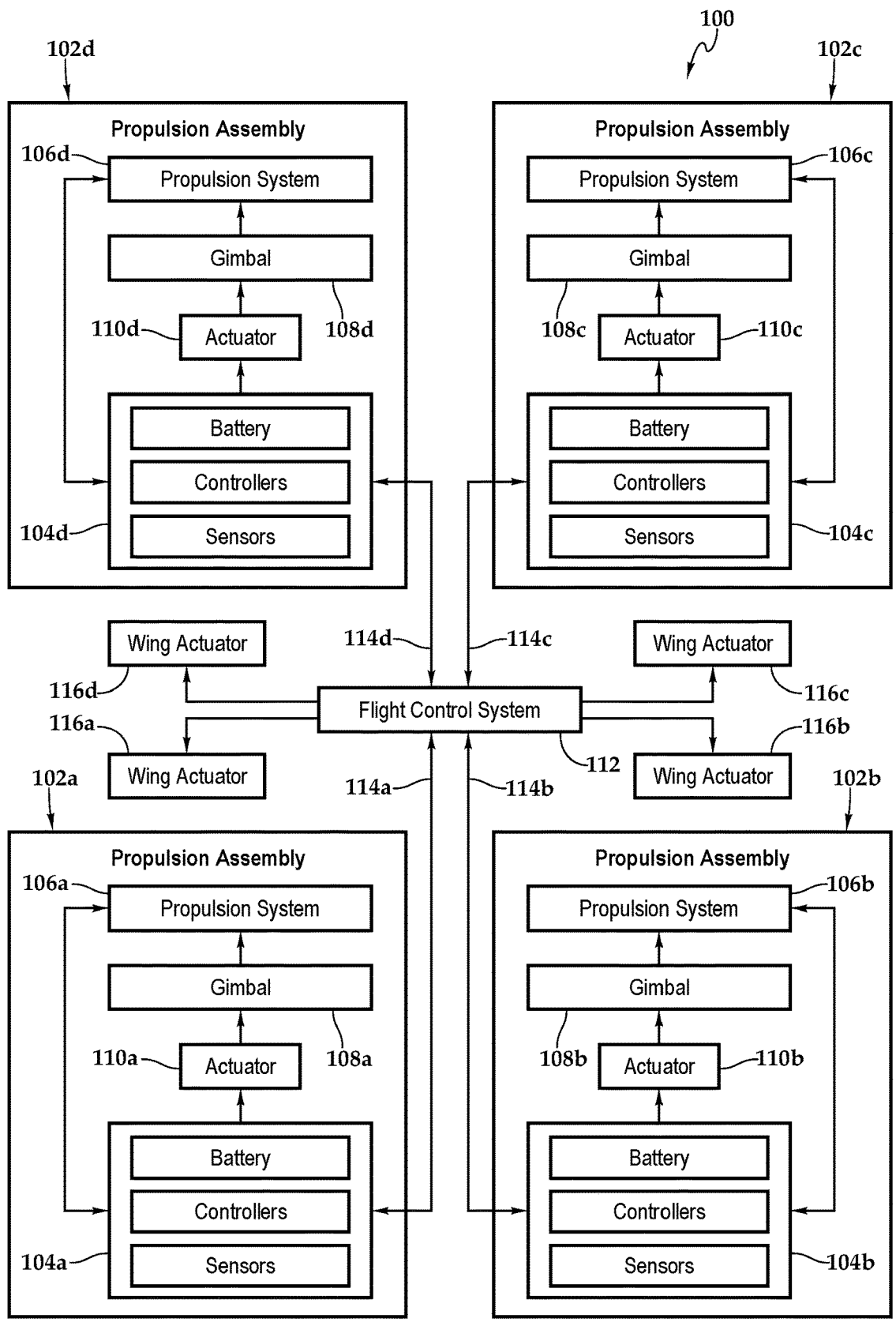
FIG. 4 is a systems diagram of an aircraft having multiple wing planforms in accordance with embodiments of the present disclosure.

Referring next to FIG. 4, a block diagram illustrates various systems of an aircraft 100 that is representative of aircraft 10 discussed herein. Specifically, aircraft 100 includes four propulsion assemblies 102a, 102b, 102c, 102d that form a two-dimensional distributed thrust array in a quadcopter configuration and a biplane configuration of aircraft 100 and a one-dimensional distributed thrust array in a monoplane configuration of aircraft 100. Propulsion assembly 102a includes an electronics node 104a depicted as including controllers, sensors and one or more batteries. Propulsion assembly 102a also includes a propulsion system 106a described herein as including an electric motor and a rotor assembly. In the illustrated embodiment, propulsion assembly 102a includes a two-axis gimbal 108a operated by one or more actuators 110a. In other embodiments, propulsion assembly 102a may include a single-axis gimbal or other mechanism for thrust vectoring. In still other embodiments, propulsion assembly 102a may be a non-thrust vectoring propulsion assembly.

Propulsion assembly 102b includes an electronics node 104b depicted as including controllers, sensors and one or more batteries. Propulsion assembly 102b also includes a propulsion system 106b described herein as including an electric motor and a rotor assembly. In the illustrated embodiment, propulsion assembly 102b includes a two-axis gimbal 108b operated by one or more actuators 110b. Propulsion assembly 102c includes an electronics node 104c depicted as including controllers, sensors and one or more batteries. Propulsion assembly 102c also includes a propulsion system 106c described herein as including an electric motor and a rotor assembly. In the illustrated embodiment, propulsion assembly 102c includes a two-axis gimbal 108c operated by one or more actuators 110c. Propulsion assembly 102d includes an electronics node 104d depicted as including controllers, sensors and one or more batteries. Propulsion assembly 102d also includes a propulsion system 106d described herein as including an electric motor and a rotor assembly. In the illustrated embodiment, propulsion assembly 102d includes a two-axis gimbal 108d operated by one or more actuators 110d.

A flight control system 112 is operably associated with each of propulsion assemblies 102a, 102b, 102c, 102d and is communicably linked to the electronic nodes 104a, 104b, 104c, 104d thereof by a fly-by-wire communications network depicted as arrows 114a, 114b, 114c, 114d between flight control system 112 and propulsion assemblies 102a, 102b, 102c, 102d. Flight control system 112 receives sensor data from and sends commands to propulsion assemblies 102a, 102b, 102c, 102d to enable flight control system 112 to independently control each of propulsion assemblies 102a, 102b, 102c, 102d as discussed herein. In addition, flight control system 112 is operable to control the operation of wing actuators 116a, 116b, 116c, 116d. As described herein, each wing actuators 116a, 116b, 116c, 116d may be disposed within a hinge assembly between a pylon and a half-wing to enable relative rotation therebetween, thereby enabling conversion of aircraft 100 between biplane and monoplane configurations during forward flight.

Figure 5:
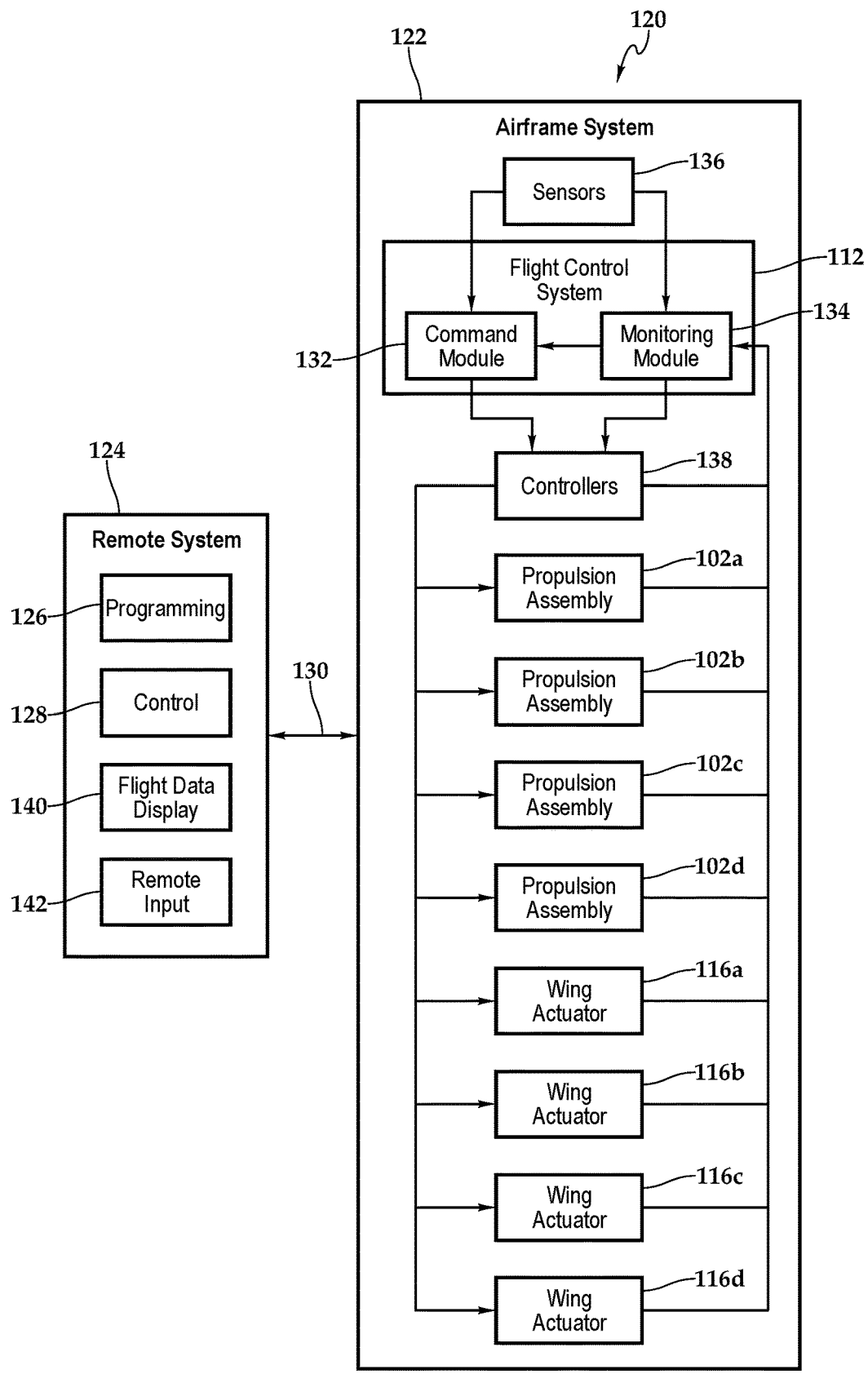
FIG. 5 is a block diagram of autonomous and remote control systems for an aircraft having multiple wing planforms in accordance with embodiments of the present disclosure.

Referring additionally to FIG. 5 in the drawings, a block diagram depicts a control system 120 operable for use with aircraft 100 or aircraft 10 of the present disclosure. In the illustrated embodiment, system 120 includes two primary computer based subsystems; namely, an airframe system 122 and a remote system 124. In some implementations, remote system 124 includes a programming application 126 and a remote control application 128. Programming application 126 enables a user to provide a flight plan and mission information to aircraft 100 such that flight control system 112 may engage in autonomous control over aircraft 100. For example, programming application 126 may communicate with flight control system 112 over a wired or wireless communication channel 130 to provide a flight plan including, for example, a starting point, a trail of waypoints and an ending point such that flight control system 112 may use waypoint navigation during the mission. In addition, programming application 126 may provide one or more tasks to flight control system 112 for aircraft 100 to accomplish during the mission. Following programming, aircraft 100 may operate autonomously responsive to commands generated by flight control system 112.

Flight control system 112 preferably includes a non-transitory computer readable storage medium including a set of computer instructions executable by a processor. Flight control system 112 may be a triply redundant system implemented on one or more general-purpose computers, special purpose computers or other machines with memory and processing capability. For example, flight control system 112 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 112 may be a microprocessor-based system operable to execute program code in the form of machine-executable instructions. In addition, flight control system 112 may be selectively connectable to other computer systems via a proprietary encrypted network, a public encrypted network, the Internet or other suitable communication network that may include both wired and wireless connections.

In the illustrated embodiment, flight control system 112 includes a command module 132 and a monitoring module 134. It is to be understood by those skilled in the art that these and other modules executed by flight control system 112 may be implemented in a variety of forms including hardware, software, firmware, special purpose processors and combinations thereof. Flight control system 112 receives input from a variety of sources including internal sources such as sensors 136, controllers 138, propulsion assemblies 102a, 102b, 102c, 102d, wing actuators 116a, 116b, 116c, 116d and external sources such as remote system 124 as well as global positioning system satellites or other location positioning systems and the like. For example, as discussed herein, flight control system 112 may receive a flight plan for a mission from remote system 124. Thereafter, flight control system 112 may be operable to autonomously control all aspects of flight of an aircraft of the present disclosure.

For example, during the various operating modes of aircraft 100 including VTOL operations, forward flight operations and conversion operations, command module 132 provides commands to controllers 138. These commands enable independent operation of propulsion assemblies 102a, 102b, 102c, 102d and collective operation of wing actuators 116a, 116b, 116c, 116d. Flight control system 112 receives feedback from controllers 138, propulsion assemblies 102a, 102b, 102c, 102d and wing actuators 116a, 116b, 116c, 116d. This feedback is processed by monitoring module 134 that can supply correction data and other information to command module 132 and/or controllers 138. Sensors 136, such as positioning sensors, attitude sensors, speed sensors, environmental sensors, fuel sensors, temperature sensors, location sensors and the like also provide information to flight control system 112 to further enhance autonomous control capabilities.

Some or all of the autonomous control capability of flight control system 112 can be augmented or supplanted by remote flight control from, for example, remote system 124. Remote system 124 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using suitable communication techniques, such as transmission control protocol/internet protocol, file transfer protocol, hypertext transfer protocol, internet protocol security protocol, point-to-point tunneling protocol, secure sockets layer protocol or other suitable protocol. Remote system 124 communicates with flight control system 112 via a communication link 130 that may include both wired and wireless connections.

While operating remote control application 128, remote system 124 is configured to display information relating to one or more aircraft of the present disclosure on one or more flight data display devices 140. Display devices 140 may be configured in any suitable form, including, for example, liquid crystal displays, light emitting diode displays or any suitable type of display. Remote system 124 may also include audio output and input devices such as a microphone, speakers and/or an audio port allowing an operator to communicate with other operators or a base station. The display device 140 may also serve as a remote input device 142 if a touch screen display implementation is used, however, other remote input devices, such as a keyboard or joystick, may alternatively be used to allow an operator to provide control commands to an aircraft being operated responsive to remote control.

Figure 6B:
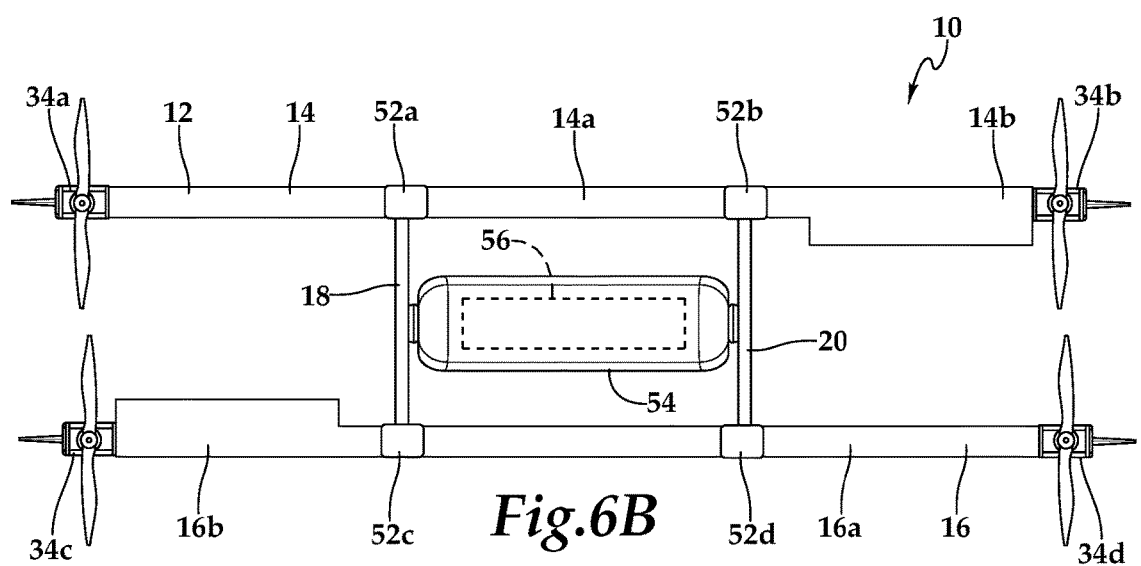
FIGS. 6A-6B are schematic illustrations of an aircraft having multiple wing planforms that is supporting a payload in accordance with embodiments of the present disclosure.
Figure 6A:
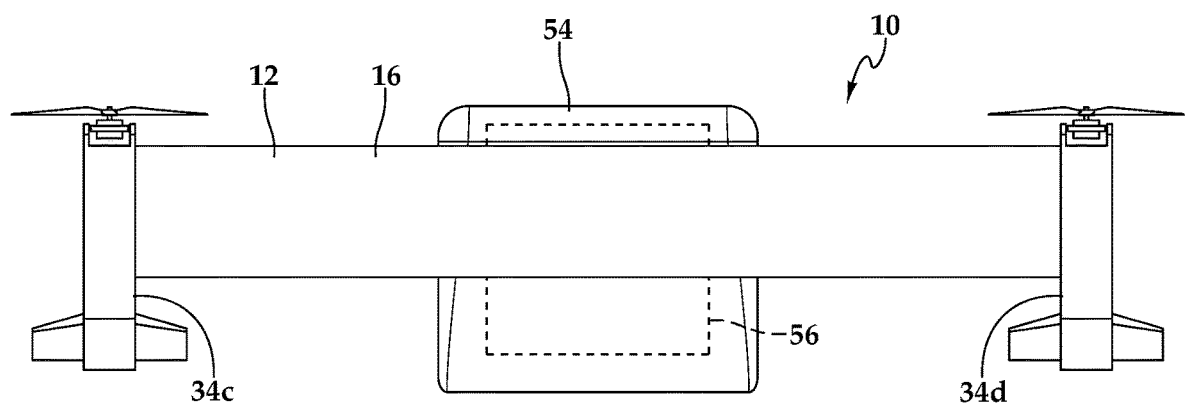

Referring now to FIGS. 6A-6B, aircraft 10 is depicted carrying a payload depicted as a pod assembly 54. In the illustrated embodiment, pod assembly 54 has an aerodynamic shape and is coupled to airframe 12 between pylons 18, 20. Aircraft 10 may operate in many roles including military, commercial, scientific and recreational roles, to name a few. For example, aircraft 10 may be a logistics support aircraft configured for cargo transportation. In the illustrated implementation, aircraft 10 is depicted carrying a single package 56 disposed within pod assembly 54. In other implementations, the cargo may be composed of any number of packages or other items that can be carried within pod assembly 54. Preferably, the cargo is fixably coupled within pod assembly 54 by suitable means to prevent relative movement therebetween, thus protecting the cargo from damage and maintaining a stable center of mass for aircraft 10. The cargo may be insertable into and removable from pod assembly 54 for delivery services. Alternatively, pod assembly 54 may be decoupled or jettisoned from airframe 12. For example, aircraft 10 may provide package delivery operations from a warehouse to customers. In the outbound delivery flight, aircraft 10 could depart in the VTOL orientation then convert to the forward flight orientation in the biplane configuration. Upon arrival at the delivery location, aircraft 10 could convert to the VTOL orientation for a tailsitting landing enable removal of pod assembly 54. Alternatively, pod assembly 54 could be released from aircraft 10 during VTOL operations. In either case, after pod assembly 54 has been removed from aircraft 10 and once aircraft 10 has converted to the forward flight orientation during the return flight to the warehouse, aircraft 10 could convert from the biplane configuration to the monoplane configuration for enhanced range and efficiency.

Figure 7B:
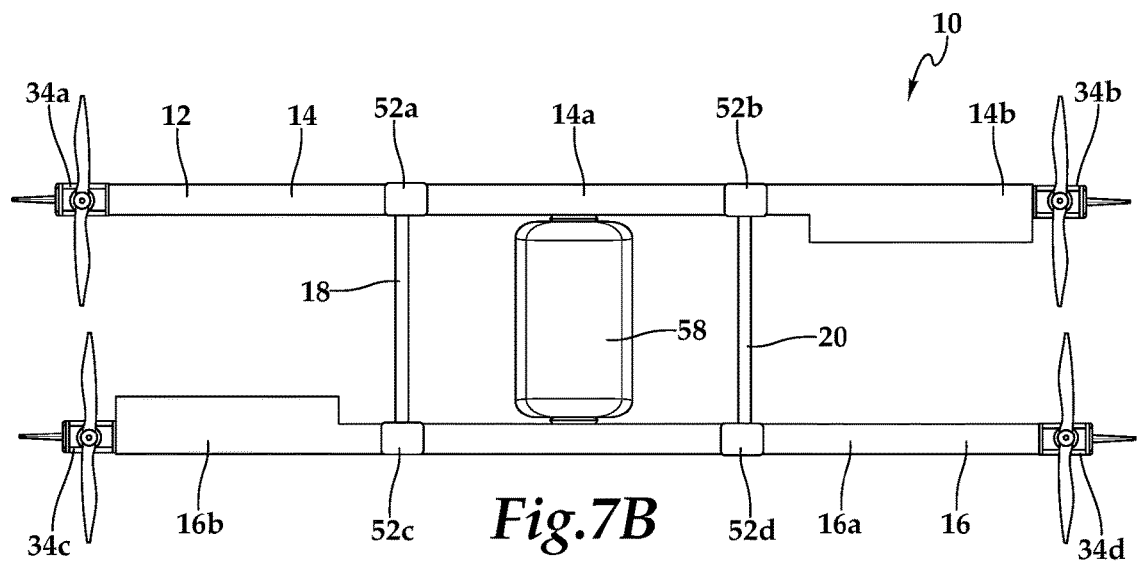
FIGS. 7A-7B are schematic illustrations of an aircraft having multiple wing planforms that is supporting a payload in accordance with embodiments of the present disclosure.
Figure 7A:
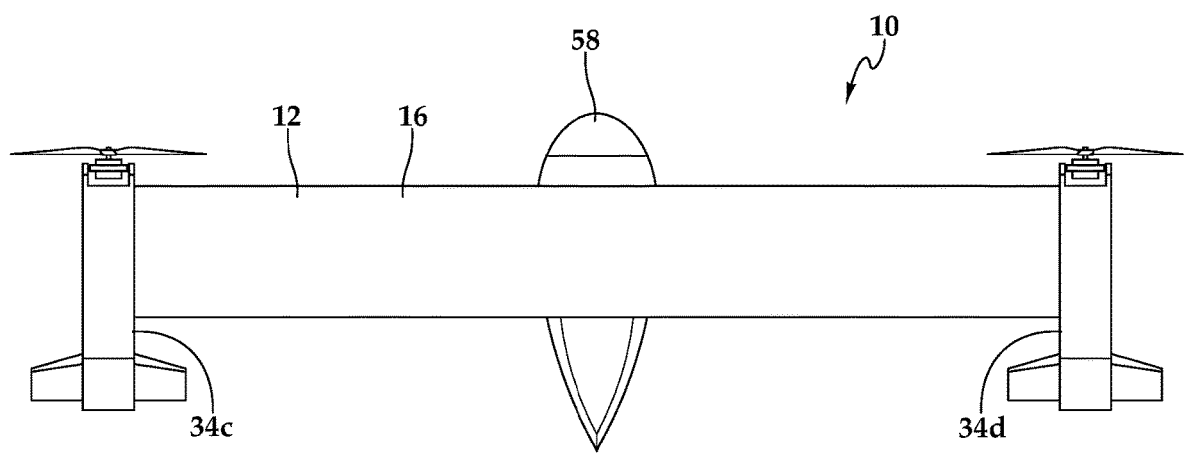

Even though pod assembly 54 has been depicted and described as being coupled between pylons 18, 20 of aircraft 10, it should be understood by those having ordinary skill in the art that an aircraft of the present disclosure could carry a payload such as a pod assembly in other manners. For example, FIGS. 7A-7B depict aircraft 10 carrying a payload depicted as a pod assembly 58 that has an aerodynamic shape and that is coupled to airframe 12 between half-wings 14, 16. As another alternative, a payload could be coupled to a single half-wing or multiple payloads could be coupled to half-wings 14, 16 and/or pylons 18, 20. In certain implementations, aircraft 10 may be operable to convert between the biplane configuration and the monoplane configuration while carrying one or more payloads.

Figure 8C:
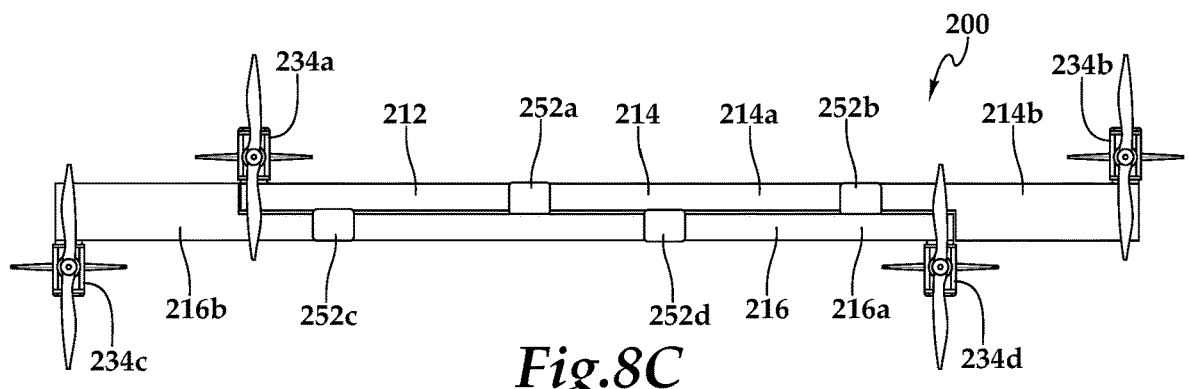
FIGS. 8A-8C are schematic illustrations of an aircraft having multiple wing planforms that is converting between a biplane configuration and a monoplane configuration in accordance with embodiments of the present disclosure.
Figure 8B:
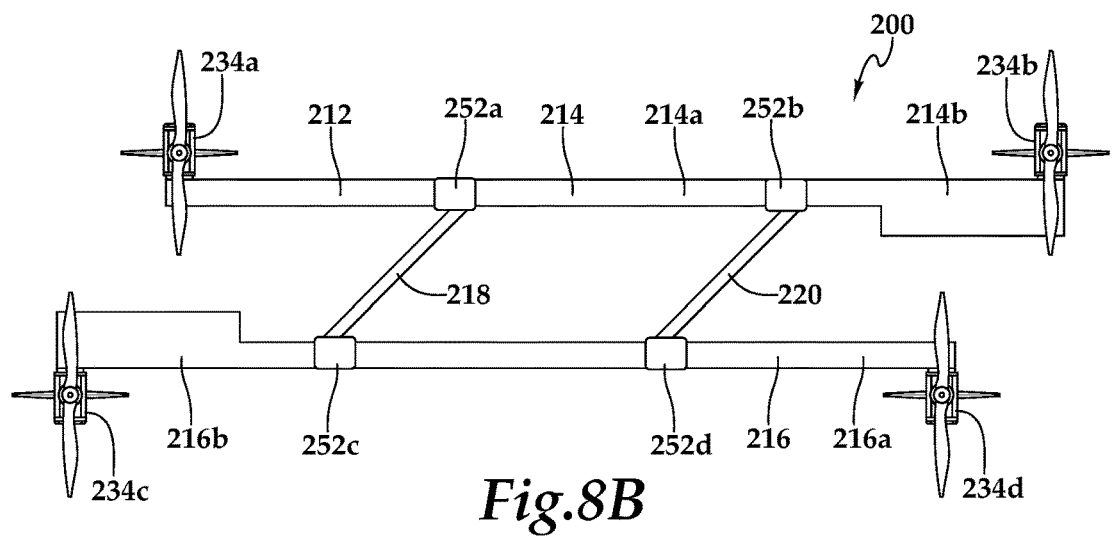
Figure 8A:
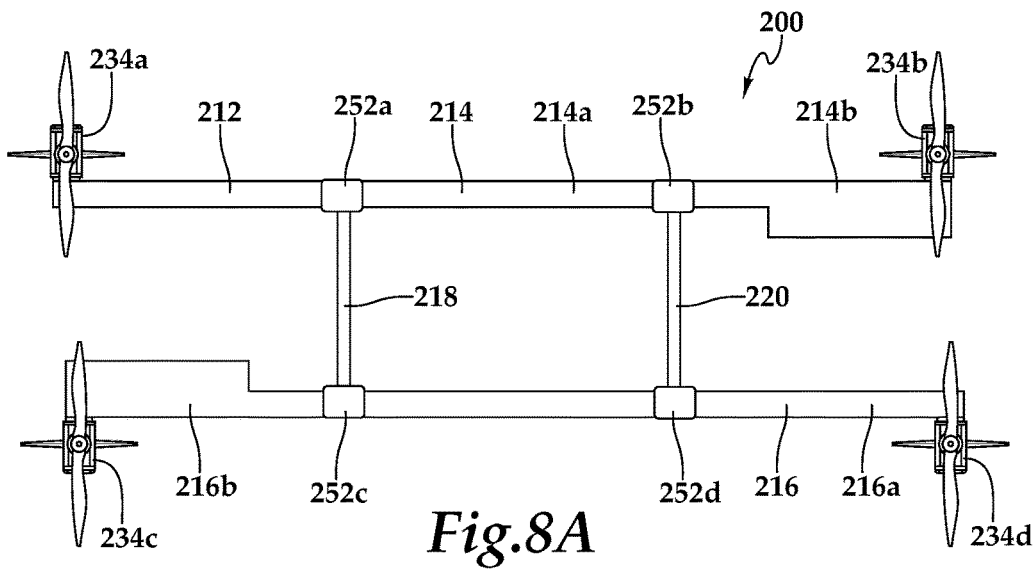

Even though aircraft 10 has been depicted and described as having wingtip mounted propulsion assemblies 34, it should be understood by those having ordinary skill in the art that an aircraft of the present disclosure could have propulsion assemblies mounted in other manners. For example, FIGS. 8A-8C depict an aircraft 200 having multiple wing planforms that is operable to transition between thrust-borne lift in a VTOL orientation and wing-borne lift in a forward flight orientation. Aircraft 200 has a quadcopter configuration in the VTOL orientation and is convertible between a biplane configuration and a monoplane configuration in the forward flight orientation. In the illustrated embodiment, aircraft 200 has an airframe 212 including half-wings 214, 216. Half-wing 214 includes a wing section 214a that has a partial airfoil cross-section and a wing section 214b that has a full airfoil cross-section. Similarly, half-wing 216 includes a wing section 216a that has a partial airfoil cross-section and a wing section 216b that has a full airfoil cross-section. When wing section 214a and wing section 216a are mated, together they form a full airfoil cross-section (FIG. 8C). Rotatably coupled between half-wing 214 and half-wing 216 are two truss structures depicted as pylons 218, 220.

Aircraft 200 has a distributed thrust array including a plurality of propulsion assemblies 234a, 234b, 234c, 234d. In the illustrated embodiment, propulsion assemblies 234a, 234b are coupled to half-wing 214 in a low wing configuration and propulsion assemblies 234c, 234d are coupled to half-wing 216 in a high wing configuration. Aircraft 200 includes a flight control system that communicates via a fly-by-wire communications network with propulsion assemblies 234. In addition, the flight control system communicates via the fly-by-wire communications network with wing actuators located within hinge assemblies 252a, 252b of half-wing 214 and hinge assemblies 252c, 252d of half-wing 216. The wing actuators cause pylon 218 to rotate relative to half-wings 214, 216 at hinge assemblies 252a, 252c and cause pylon 220 to rotate relative to half-wings 214, 216 at hinge assemblies 252b, 252d. Together, the wing actuators enable the flight control system to convert aircraft 200 between the biplane configuration (FIG. 8A) and the monoplane configuration (FIG. 8C) during forward flight.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft having multiple wing planforms, the aircraft comprising:
   an airframe having first and second half-wings with first and second pylons extending therebetween, the first half-wing having a wing section with a partial airfoil cross-section and the second half-wing having a wing section with a partial airfoil cross-section;
   a distributed thrust array attached to the airframe, the thrust array including a first plurality of propulsion assemblies coupled to the first half-wing and a second plurality of propulsion assemblies coupled to the second half-wing; and
   a flight control system coupled to the airframe, the flight control system configured to independently control each of the propulsion assemblies and control conversions between the wing planforms;
   wherein, the aircraft is configured to convert between thrust-borne lift in a VTOL orientation and wing-borne lift in a forward flight orientation; and
   wherein, in the forward flight orientation, the aircraft is configured to convert between a biplane configuration and a monoplane configuration in which the partial airfoil cross-section of the first half-wing mates with the partial airfoil cross-section of the second half-wing to form a full airfoil cross-section.

2. The aircraft as recited in claim 1 wherein each of the pylons is pivotably coupled between the first half-wing and the second half-wing.

3. The aircraft as recited in claim 1 wherein, in the forward flight orientation, the first half-wing is an upper half-wing and the second half-wings is a lower half-wing.

4. The aircraft as recited in claim 3 wherein the upper half-wing has a low wing configuration with the first plurality of propulsion assemblies and the lower half-wing has a high wing configuration with the second plurality of propulsion assemblies.

5. The aircraft as recited in claim 1 wherein each of the half-wings has two wingtips and wherein each of the propulsion assemblies is a wingtip mounted propulsion assembly.

6. The aircraft as recited in claim 1 wherein the first plurality of propulsion assemblies further comprises two propulsion assemblies and wherein the second plurality of propulsion assemblies further comprises two propulsion assemblies.

7. The aircraft as recited in claim 1 wherein the aircraft has a multicopter configuration in the VTOL orientation.

8. The aircraft as recited in claim 1 wherein the aircraft has a quadcopter configuration in the VTOL orientation.

9. The aircraft as recited in claim 1 wherein, in the biplane configuration, the thrust array forms a two-dimensional thrust array.

10. The aircraft as recited in claim 1 wherein, in the monoplane configuration, the thrust array forms a one-dimensional thrust array.

11. The aircraft as recited in claim 1 wherein each of the propulsion assemblies is a non-thrust vectoring propulsion assembly.

12. The aircraft as recited in claim 1 wherein each of the propulsion assemblies is a unidirectional thrust vectoring propulsion assembly.

13. The aircraft as recited in claim 1 wherein each of the propulsion assemblies is an omnidirectional thrust vectoring propulsion assembly.

14. The aircraft as recited in claim 1 wherein the flight control system is configured to convert the aircraft between the biplane configuration and the monoplane configuration during forward flight.

15. The aircraft as recited in claim 1 wherein the flight control system is configured for remote flight control.

16. The aircraft as recited in claim 1 wherein the flight control system is configured for autonomous flight control.

17. The aircraft as recited in claim 1 further comprising a pod assembly coupled to the airframe.

18. The aircraft as recited in claim 1 further comprising a pod assembly coupled between the first and second pylons.

19. The aircraft as recited in claim 1 further comprising a pod assembly coupled between the first and second half-wings.

20. An aircraft having multiple wing planforms, the aircraft comprising:
  an airframe having first and second half-wings with first and second pylons extending therebetween, the first half-wing having a wing section with a partial airfoil cross-section and the second half-wing having a wing section with a partial airfoil cross-section;
  a distributed thrust array attached to the airframe, the thrust array including two propulsion assemblies coupled to the first half-wing and two propulsion assemblies coupled to the second half-wing; and
  a flight control system coupled to the airframe, the flight control system configured to independently control each of the propulsion assemblies;
  wherein, the aircraft is configured to convert between thrust-borne lift in a VTOL orientation and wing-borne lift in a forward flight orientation;
  wherein, in the VTOL orientation, the distributed thrust array has a quadcopter configuration;
  wherein, in the forward flight orientation, the first and second half-wings have a biplane configuration in a first planform with the thrust array configured as a two-dimensional thrust array;
  wherein, in the forward flight orientation, the first and second half-wings have a monoplane configuration in a second planform in which the partial airfoil cross-section of the first half-wing mates with the partial airfoil cross-section of the second half-wing to form a full airfoil cross-section and with the thrust array configured as a one-dimensional thrust array; and
  wherein, the flight control system is configured to convert the first and second half-wings between the first and second planforms during forward flight.

* * * * *